12/2/86 XR 4,626,454

United States Patent [19]

Sandman

[11] Patent Number: 4,626,454

[45] Date of Patent: Dec. 2, 1986

[54] DECORATIVE FITTING

[75] Inventor: Robert B. Sandman, Sheboygan, Wis.

[73] Assignee: Kohler Co., Kohler, Wis.

[21] Appl. No.: 762,261

[22] Filed: Aug. 5, 1985

[51] Int. Cl.[4] .......................... B44F 1/12; B29C 1/02; B29F 1/08

[52] U.S. Cl. ........................................ 428/13; 428/15; 428/48; 428/90; 428/908.8; 428/919; 74/501 P; 74/557; 264/261; 264/267; 425/110; 425/117; 425/127; 425/129 R; 425/812

[58] Field of Search ................ 428/15, 90, 908.8, 919, 428/13, 48; 74/501 P, 557; 264/261, 267; 30/164; 156/244.22, 292; 425/110, 117, 127, 129 R, 812

[56] References Cited

U.S. PATENT DOCUMENTS

| | | | |
|---|---|---|---|
| 3,439,077 | 4/1969 | Fischler | 264/73 |
| 3,634,179 | 1/1972 | Anderson | 161/19 |
| 3,761,554 | 9/1973 | Barnette | 264/69 |
| 3,787,544 | 1/1974 | Barnette | 264/69 |
| 3,812,229 | 5/1974 | Anderson | 264/60 |
| 3,843,977 | 10/1974 | Garnett | 4/69 |
| 4,446,177 | 5/1984 | Munoz et al. | 428/15 |
| 4,465,728 | 8/1984 | Haish et al. | 428/156 |

*Primary Examiner*—John E. Kittle
*Assistant Examiner*—Patrick J. Ryan
*Attorney, Agent, or Firm*—Quarles & Brady

[57] ABSTRACT

A decorative fitting having an internal layer as well as a method of fabricating it are disclosed. Preferably, the color layer is a very thin color wall dimensioned so that when it is viewed at one angle it gives the appearance of being a solid wall, yet when it is viewed at another angle it is substantially transparent. To make the color wall, one preferably forms a frame on a first substantially transparent panel such that the frame projects out from the first panel surface. One then abuts a second substantially transparent panel against the frame so as to form a color material insert cavity point, one injects a flowable colored material/adhesive mixture into the cavity and permits the colored adhesive to harden and bind the panel walls together. Thereafter, one cuts the transparent panels into a multiplicity of handle components by cutting the walls along lines partially transverse to the color layer. This forms multiple handle components which are a sandwich of the walls with the color layer in between.

15 Claims, 5 Drawing Figures

FIG. 1
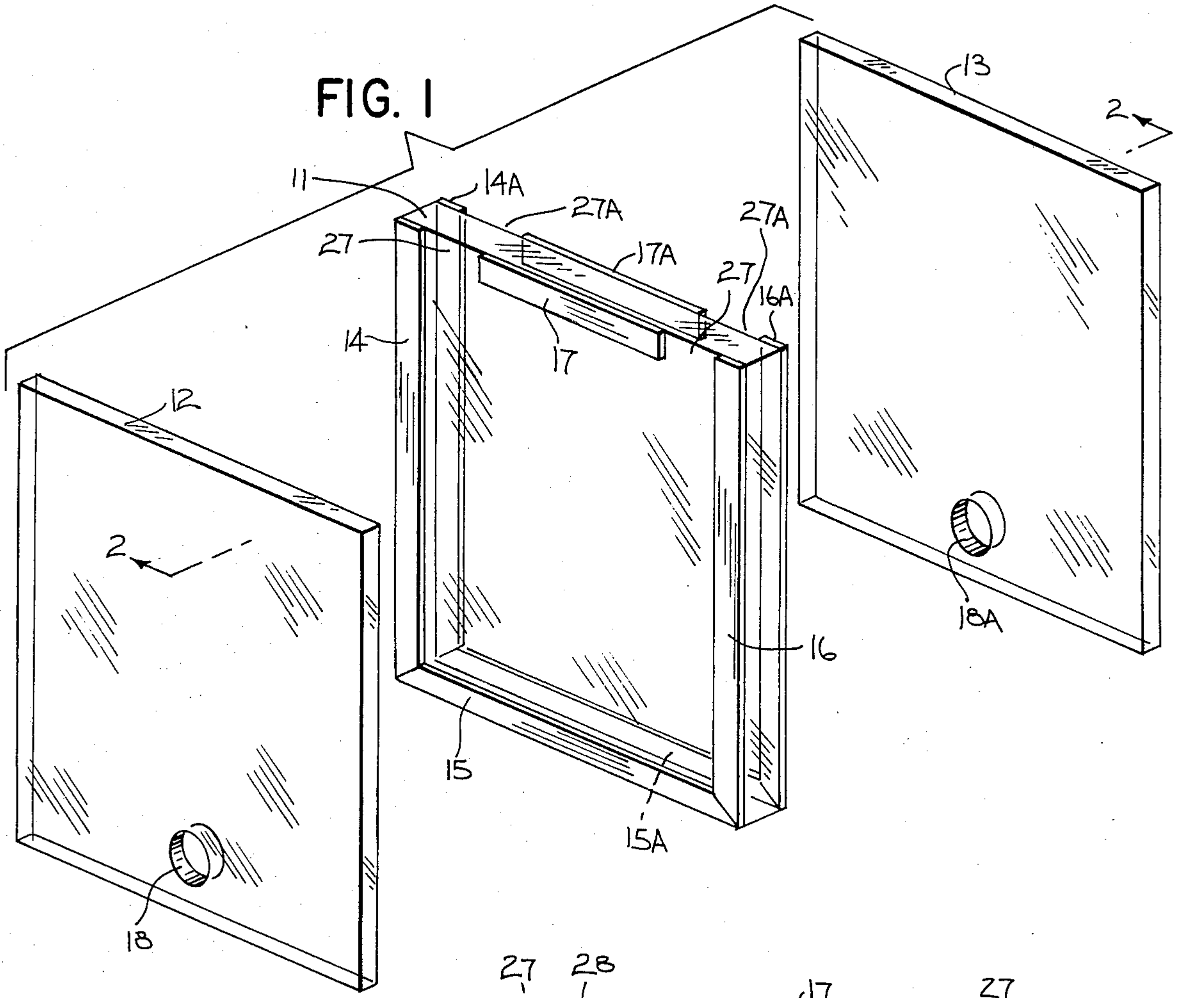
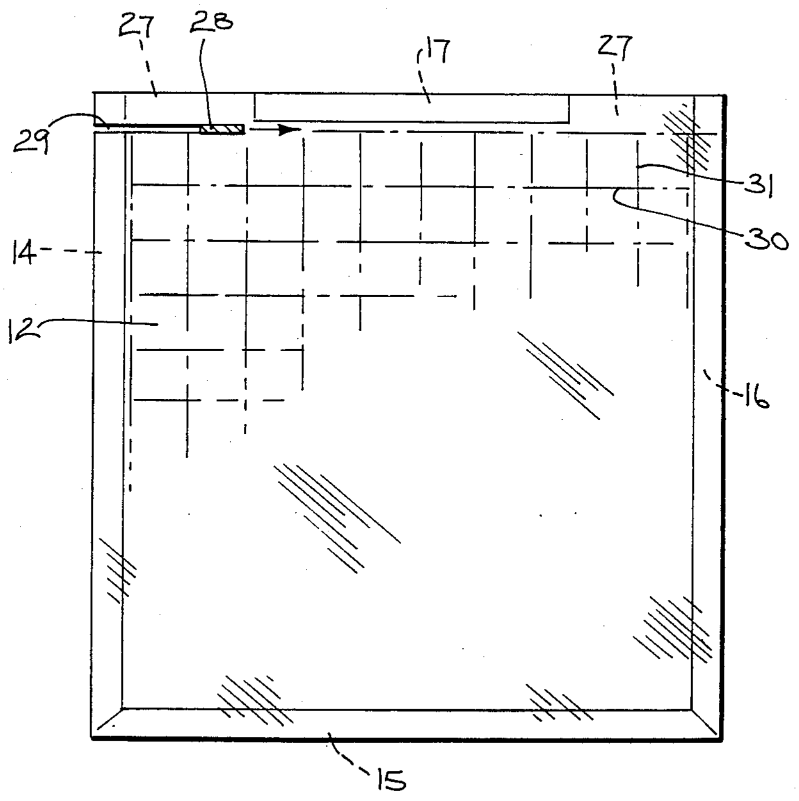
FIG. 3

DECORATIVE FITTING

BACKGROUND OF THE INVENTION

A. Field of the Invention

This invention relates to largely transparent decorative fittings having a narrow color layer formed therein, and to methods for producing such fittings. It appears to be especially well suited for use in the plumbing field (e.g. to provide valve control handles).

B. Description of the Art

It is known in the art to make valve handles from acrylic so that they are largely transparent. For heightened decorative effect, there have also been attempts to insert color walls inside the acrylic so as to provide a slight tint to the handle when the handle is viewed from a direction perpendicular to the color wall. Prior art color walls were provided in valve handles by layering a thin sheet of colored plastic over a preformed acrylic sheet, and then placing a second acrylic sheet over the top side of the color wall. This "sandwich" technique was also utilized to fabricate other decorative objects such as paperweights. However, because of the thickness of coventional plastic sheets, one could readily see that a plastic color sheet had been inserted into the acrylic, and much of the decorative value was therefore lost. Also, once the thinness of the conventional color wall sheets got below 0.065", it became very difficult to handle the preformed plastic without having them break up as they were being transferred over the panels.

Thus, the applicant has not found anywhere in the prior art an acrylic decorative fitting in which a color layer having a thickness below 0.040" has been inserted. As will become clear from the description which follows, such extreme narrowness is highly desirable because it can provide the illusion of the color wall being almost invisible when the layer is looked at in one direction, without showing a clear layering effect when the handle is viewed from the side. Thus, similar to the curiosity and wonderment aroused by the illusion of placing ships in a narrow neck bottle, the present invention makes the consumer wonder how the wall of color has been inserted.

SUMMARY OF THE INVENTION

The present invention therefore relates to decorative fittings with extremely narrow color walls and methods for making them. In one embodiment, there is a method of forming a decorative fitting so that it has an internal color layer. It comprises forming a frame on a first substantially transparent panel such that the frame projects out from a side surface of the first panel. One abuts a second substantially transparent panel against the frame so as to form a color-insert cavity. The cavity is defined by the edges of the frame and the space between adjacent walls of the transparent panels.

At this point, one places a flowable color material and adhesive in the cavity, usually by injection, and permits them to harden in the cavity and bind to the panels (so as to form a sandwich structure). Once hardened, one cuts the sandwich structure into at least two fitting components both of which comprise a sandwich of a portion of both of the panels with a segment of the color layer in between. The frame can be integrally formed with the first transparent panel, or one can form the frame by another method such as by adhering extremely thin metal shim segments to the first transparent panel.

In an especially preferred form, the frame can be formed with a gap in it so as to permit air from the cavity to easily escape when the color material and adhesive are placed in the cavity, and the color/adhesive can be injected into the cavity through a transverse hole formed in one of the transparent panels. It is preferred that the frame projects out from the first panel less than 0.04 inches in the direction of the second panel. The preferred adhesive is an acrylic adhesive and it is preferred to clamp the panels together while the color material and adhesive are hardening.

If two color layers are desired, a frame can be formed on both sides of the first panel surface and color walls can be formed on both sides of the first panel surface through the use of two transparent panels clamped to the two sides of the first panel.

In another form, there is provided a handle knob having at least one internal color layer formed therein. It comprises a first substantially transparent panel, at least a second substantially transparent panel, and a layer of colored material positioned between the two panels which has a thickness of no greater than 0.04 inches. Such a handle knob can also be formed with two color walls, one on each side of the first panel.

In yet another form, the handle knob can have a first substantially transparent panel, at least a second substantially transparent panel, and a thin layer of color-solidified material positioned between the panel sections. The thin layer of material is constructed and arranged to be visible at one position, yet substantially invisible when viewed 90 degress therefrom.

It should be appreciated that one aspect of the present invention is the realization that extremely thin frames (e.g. made out of a rigid metal and/or formed integrally with the first panel) can be provided so as to permit the creation of a color layer of the requisite thickness. Another aspect of the invention is the realization that a series of handle components can be cut out of the sandwich portion which is inside the frame. This creates a highly efficient production process, and only minimal waste of materials.

The objects of the invention therefore include:

Providing a decorative fitting of the above kind having one or more extremely thin color walls and an otherwise substantially transparent body;

Providing a method of the above kind forming such a decorative fitting;

Providing a method of the above kind in which multiple fitting components can be formed at the same time;

Providing a method of the above kind in which multiple color walls can be inserted in the same handle knob at the same time; and Providing a highly efficient process of the above kind for producing decorative valve handles; these and other objects and advantages of the present invention will be apparent from the description which follows.

This description is provided by way of illustrating the present invention, not to limit its scope.

DESCRIPTION OF THE DRAWINGS

A better understanding of the invention will be had with reference to the accompanying drawings:

FIG. 1 is an exploded assembly view in perspective illustrating the orientation of three panel members and two frames prior to the forming of color walls;

FIG. 3 is a side elevational view illustrating the cutting of handle knob components from the sandwich panel members after the adhesive material has solidified;

DESCRIPTION OF THE PREFERRED EMBODIMENTS

Figure 4:
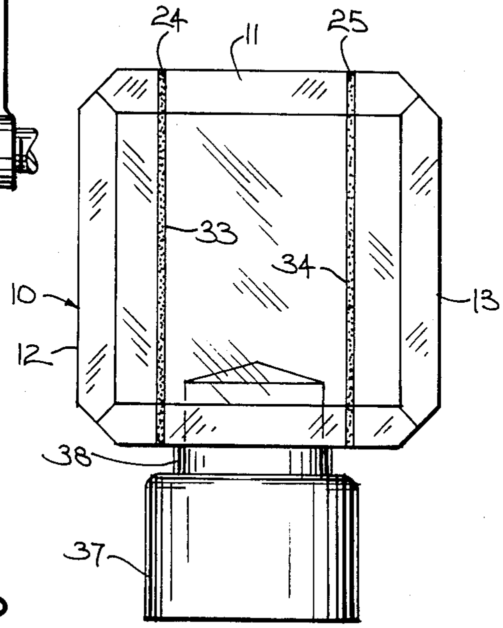
FIG. 4 is an end view of the finished handle after it has been placed on an insert member.
Figure 5:
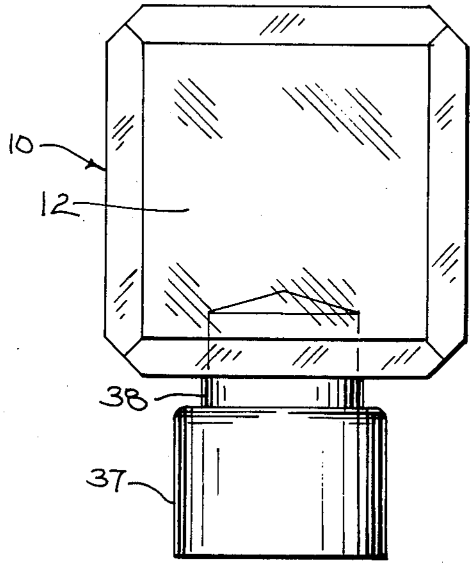
FIG. 5 is another end view of the handle illustrated in FIG. 4, with the handle turned 90° showing the largely invisible appearance of the color walls.

A handle formed in accordance with the present invention, generally 10, is shown in its finished form in FIGS. 4 and 5 of the attached drawings. To make this handle, one can follow the process depicted in FIGS. 1-3 and described below.

The method of fabricating the handle involves the use of a "first" panel member 11 and two outer panels 12 and 13 (the "second" and "third") panels, these panels are 24" by 24" cast acrylic and substantially transparent. Preferably, panels 12 and 13 are one-half inch thick, and panel 11 is one-inch thick.

Six pieces of metal shim stock having a thickness of 0.025 inches are cut into ½" by 24" strips. And two pieces are cut into ½" by 12" strips. Double-stick tape is secured on one side of the shims, and they are placed on both sides of the panel 11 in the fashion shown in FIG. 1 to form the border strips 14, 15, 16 and 17 on one side of the panel and 14A, 15A, 16A and 17A on the opposite side of the panel. Note the air release gaps 27 and 27A in the frame.

Figure 2:
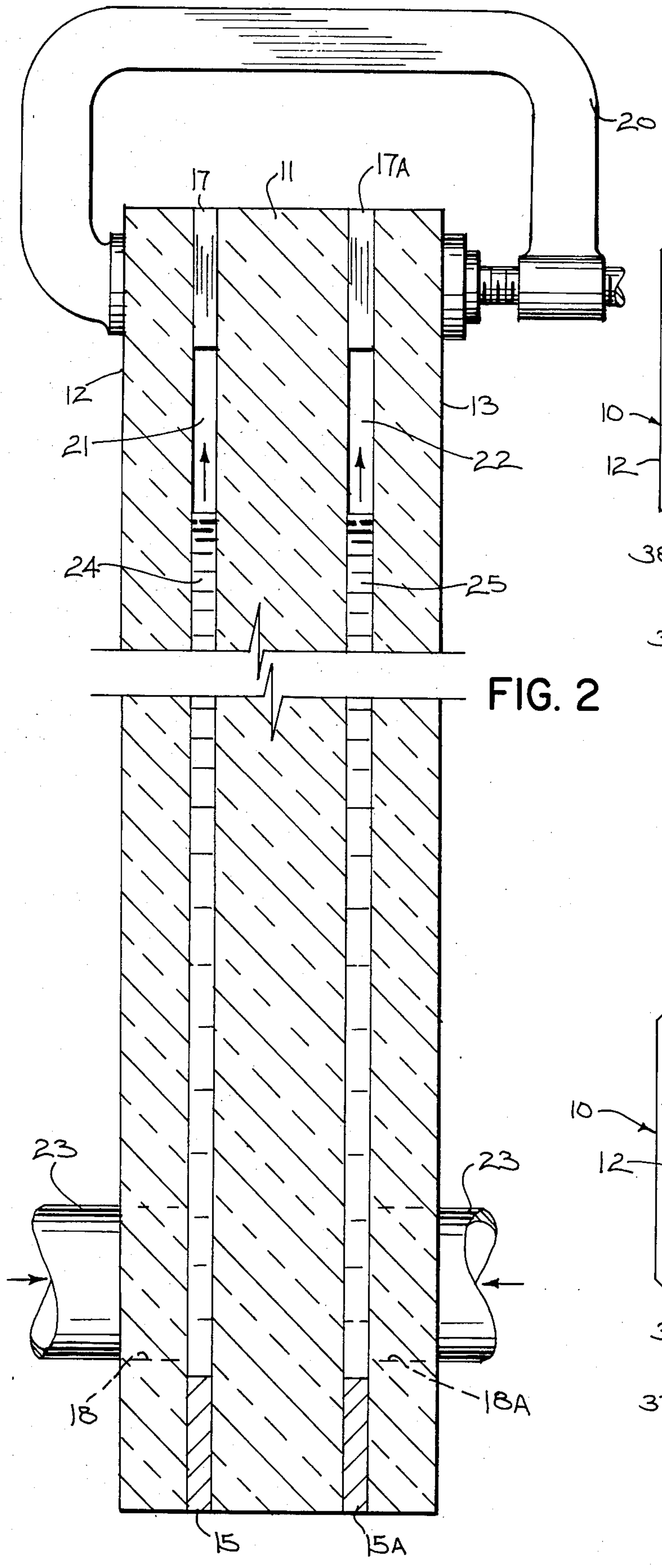
FIG. 2 is a view in vertical section taken along line 2—2 in FIG. 1, after the panel wall members have been clamped together.

Apertures 18 and 18A are drilled through the lower base portions of panels 12 and 13 to provide an inlet diameter of 0.166 inches for injection of the color material. The surfaces of the panels 12 and 13 are then wiped with a lint-free cloth (treated with denatured alcohol to remove dirt and static charge). Then, the three panels 11, 12 and 13 are positioned adjacent to each other with their edge portions aligned as shown in FIG. 2. They are then clamped together using gluing clamp 20.

An acrylic adhesive sold under the trade name PS-30 (by T.F.E. Industries) is utilized. It should be pointed out that the PS-30 acrylic adhesive is a two-component system. 950 grams of Component A is combined initially with the desired quantity of an Orasol black dye obtained from the Ciba-Geigy Corporation. It will also be combined with a dispersing agent for the dye which is sold under the trade name Degament 1011 which is available from Dequssa Corporation. The amount of the dispersing agent will be of a quantity to give the desired intensity of color. The dye and dispersing agent are mixed with the Component A acrylic for one hour on a suitable jar roller. After this time, 50 grams of PS-30 Component B is added to the dyed PS-30 Component A mixture, and mixed thoroughly for two to three minutes. The resulting mixed materials will then be placed in a suitable pressure tank. Other color/adhesive systems may also prove useful.

When the panel members 11-13 have been assembled in the manner shown in FIG. 2 and clamped, the colored adhesive can be injected through the apertures 18 and 18A by suitable nozzles 23 at a preferred pressure of 40 psig. The colored adhesive material indicated at 24 and 25 in FIG. 2 will then flow between the panels and into the dye cavities 21 and 22. It will be appreciated that these cavities are defined by the inner edges of the frames 14-17 and 14A-17A, and the spacing between the panels 11-13.

The adhesive material 24 and 25 will flow into the cavities 21 and 22 until it reaches the top portions of the panel. During this period, any trapped air will be released through the gaps 27.

The flow of the material through the nozzles 23 can then be stopped and the feed lines removed. Suitable tapered pins can then be placed in the holes 18 and 18A. After the adhesive has been allowed to solidify, the tapered pins can be removed. Panel members can then be cut into two-inch by two-inch squares as indicated by the intersecting lines shown in FIG. 3. A band saw is represented by the saw blade 28. It can be used to cut through the panels 11-13.

One can then machine the handles with decorative chamfers by a milling machine or other cutting device and then polish the surfaces. Any machining marks can be removed by lightly sanding in a circular motion with a wet or dry sandpaper, and the facets of the acrylic handles can then be power-buffed using a clean buffing wheel and buffing compound.

A handle insert 37 with a neck portion 38 can be placed into the handle if desired. This is effectuated by supporting the handle 10 into a two-jaw chuck, and boring a suitable hole into one of the surfaces. Heat can then be supplied by a suitable heat gun in the hole, and the insert can then be jammed into the fixture when the bore is suitably heated. The temperature of the heat gun is usually about 300°-350° F. and it is usually used for about three minutes. The resulting handle will be substantially in the form shown in FIGS. 4 and 5.

It will be appreciated that for purposes of illustration the color wall panels 33 and 34, are shown as visible when viewed as shown in FIG. 4. In fact, while the walls can be seen from this angle they are so thin that one cannot discern any gap between the transparent segments when one carefully examines the handle. As the handle is rotated 90° to the FIG. 5 position the color wall appears to disappear and all that appears is a slight smoky coloration. If one were to place one's finger at the opposite side of the handle 10 from that shown in FIG. 5 the finger would be clearly visible through the handle. This is an especially interesting phenomena when one considers that two of such color walls have been provided in the handle.

The decorative handle shown in the drawings has three acrylic panel segments and two color walls. However, the principle of this invention could be applied to a handle or other decorative fitting having just one color wall and two panel members. Alternatively, three or more color walls could be fabricated by placing the frames between additional panels. In such a case, it is assumed that the introduction of adhesive material would be to some extent through gaps in the frames.

Also, the terms "color", "colored" or "color material" as used herein, are meant to include any pigmentation or dying of the adhesive material. Black is the preferred color material. However, other colors are within the scope of the claims.

Further, while uniformly thin color layers have been provided in the preferred embodiment, the layer could be of somewhat varying thickness or interrupted design such as strips if desired. Such an effect might involve forming of some integral surface treatment on the surface of one of the panel layers adjacent the cavity.

Also, while gaps in the frame have been used to permit air to escape, other types of air release gaps could be used such as additional holes cut into the panels. Thus the frame could go all the way around without gaps.

Also, while a single frame between adjacent panels has been shown, one could provide multiple frames between adjacent walls to extend thickness or part of a frame on one wall and the rest on the other.

Thus, while certain preferred embodiments have been described above, it should be readily apparent to those skilled that a number of other modifications and changes can be made without departing from the invention. Therefore, it is intended that the scope of the invention should not be limited solely by the description of the preferred embodiments.

I claim:

1. A method of forming a decorative fitting so that it has an internal color layer, comprising:

forming a frame on a first substantially transparent panel such that the frame projects out from a side surface of the first panel;

abutting a second substantially transparent panel against the frame so as to form a color-insert cavity, said cavity being defined by the edges of the frame and the space between adjacent walls of the transparent panels;

placing a flowable color material and adhesive in the cavity and permitting the color material and adhesive to harden in the cavity and bind to the panels so as to form a sandwich structure; and cutting the sandwich structure into at least two fitting components, both of which comprise a sandwich of a portion of both of the panels with a segment of the color layer in between.

2. The method of claim 1, wherein the decorative fitting is a handle.

3. The method of claim 1, wherein the frame is integrally formed with the first transparent panel.

4. The method of claim 1, wherein the frame is formed by adhering metal shim segments to the first transparent panel.

5. The method of claim 1, wherein the frame has a gap in it so as to permit air from the cavity to escape when the color material and adhesive are placed in the cavity.

6. The method of claim 1, wherein the color material and adhesive are injected into the cavity under pressure through a transverse hole formed in one of the transparent panels.

7. The method of claim 1, wherein the frame projects out from the first panel side surface less than 0.040 inches in the direction of the second panel.

8. The method of claim 1, wherein the adhesive is an acrylic adhesive.

9. The method of claim 1, wherein the transparent panels are clamped together while the color material and adhesive are hardening.

10. The method of claim 1, wherein a second frame is formed on the first panel on the surface which is opposite from the first side surface, and a third transparent panel abutting against the second frame is used to form a second color layer on that side of the first panel.

11. A decorative fitting having at least one internal color layer formed therein, comprising:

a first substantially transparent panel;

at least a second substantially transparent panel; and a thin layer of colored material positioned between said panels having a thickness no greater than 0.04 inches.

12. The decorative fitting of claim 11 further comprising a third substantially transparent panel with an additional layer of said colored material placed between said first panel and said third panel.

13. The decorative fitting of claim 12, wherein said color material is mixed in an adhesive.

14. The decorative fitting of claim 13, wherein the color material is mixed in an acrylic resin.

15. A handle knob having at least one internal color layer formed therein, comprising:

a first substantially transparent panel;

at least a second substantially transparent panel; and one or more layers of colored solidified material positioned between said panels, said one or more layers of colored material constructed and arranged so as to be visible at one position, yet substantially invisible when viewed 90 degrees therefrom.

* * * * *